United States Patent
Hayashi et al.

(10) Patent No.: US 10,669,494 B2
(45) Date of Patent: Jun. 2, 2020

(54) SLAG DISCHARGE SYSTEM, GASIFIER PROVIDED WITH SAME, AND METHOD FOR OPERATING SLAG DISCHARGE SYSTEM

(71) Applicant: Mitsubishi Hitachi Power Systems, Ltd., Yokohama-shi, Kanagawa (JP)

(72) Inventors: Tomoya Hayashi, Kanagawa (JP); Masato Murayama, Kanagawa (JP); Yoshinori Koyama, Tokyo (JP); Naoshige Yoshida, Kanagawa (JP); Yasuyuki Miyata, Tokyo (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 28 days.

(21) Appl. No.: 16/098,208

(22) PCT Filed: Jun. 9, 2017

(86) PCT No.: PCT/JP2017/021551
§ 371 (c)(1),
(2) Date: Nov. 1, 2018

(87) PCT Pub. No.: WO2017/217345
PCT Pub. Date: Dec. 21, 2017

(65) Prior Publication Data
US 2019/0144770 A1    May 16, 2019

(30) Foreign Application Priority Data

Jun. 13, 2016  (JP) .................................. 2016-117027

(51) Int. Cl.
*C10J 3/50*    (2006.01)
*C10J 3/52*    (2006.01)
(Continued)

(52) U.S. Cl.
CPC . *C10J 3/50* (2013.01); *C10J 3/08* (2013.01); *C10J 3/46* (2013.01); *C10J 3/52* (2013.01);
(Continued)

(58) Field of Classification Search
CPC ............... C10J 3/52; C10J 3/523; C10J 3/526
See application file for complete search history.

(56) References Cited

U.S. PATENT DOCUMENTS

2011/0284673 A1* 11/2011 Hanrott ................... B02C 23/18
                                                           241/62
2012/0196241 A1    8/2012 Koyama et al.
(Continued)

FOREIGN PATENT DOCUMENTS

JP    07-109471 A    4/1995
JP    09-125076 A    5/1997
(Continued)

OTHER PUBLICATIONS

International Search Report dated Jul. 4, 2017, issued in counterpart International Application No. PCT/JP2017/021551, with English translation (4 pages).
(Continued)

*Primary Examiner* — Matthew J Merkling
(74) *Attorney, Agent, or Firm* — Westerman, Hattori, Daniels & Adrian, LLP

(57) ABSTRACT

A system is disclosed provided with: a slag bath that retains slag cooling water and receives slag; a slag cooling water feed line and a slag pump outlet via which the slag and the slag cooling water are pumped and fed to a slag separation device; a circulation pump that forms a water flow for pumping out the slag; a slag cooling water circulation line linking from the slag separation device to the slag bath; a reverse flow line that causes the slag cooling water dispensed from the circulation pump to flow in reverse in the
(Continued)

slag cooling water feed line; a selective supply unit capable of selectively supplying the slag cooling water dispensed from the circulation pump to the slag cooling water circulation line and the reverse flow line; and a water supply line, one end of which is connected to the slag cooling water feed line.

22 Claims, 6 Drawing Sheets

(51) Int. Cl.
*C10J 3/08* (2006.01)
*C10J 3/46* (2006.01)
*C10J 3/72* (2006.01)

(52) U.S. Cl.
CPC ....... *C10J 3/723* (2013.01); *C10J 2300/1628* (2013.01); *Y02E 20/18* (2013.01)

(56) References Cited

U.S. PATENT DOCUMENTS

| | | |
|---|---|---|
| 2014/0237986 A1 | 8/2014 | Tazawa et al. |
| 2015/0090938 A1* | 4/2015 | Meyer ...................... C10J 3/466 252/373 |
| 2015/0240171 A1* | 8/2015 | Mani ........................ C10J 3/526 252/373 |

FOREIGN PATENT DOCUMENTS

| | | | |
|---|---|---|---|
| JP | 2002-080864 A | | 3/2002 |
| JP | 2005350112 A | * | 12/2005 |
| JP | 2011-074274 A | | 4/2011 |
| JP | 2013-056972 A | | 3/2013 |
| JP | 2013-082830 A | | 5/2013 |
| JP | 5743093 B2 | | 7/2015 |

OTHER PUBLICATIONS

Written Opinion dated Jul. 4, 2017, issued in counterpart Application No. PCT/JP2017/021551, with English Translation. (10 pages).

* cited by examiner

OPEN/CLOSED STATE OF VALVE

| | NORMAL OPERATION MODE | REVERSE FLOW OPERATION MODE | STIRRING OPERATION MODE |
|---|---|---|---|
| WATER FEED CUTOFF VALVE 25 | ○ | × | × |
| CIRCULATION CUTOFF VALVE 26 | ○ | × | × |
| REVERSE FLOW CUTOFF VALVE 27 | × | ○ | × |
| WATER SUPPLY VALVE 28 | × | ○ | ○ |
| STIRRING LINE VALVE 30 | × | × | ○ |

(○ → OPENED, × → CLOSED)

FIG. 5

OPEN/CLOSED STATE OF VALVE

|  | NORMAL OPERATION MODE | REVERSE FLOW OPERATION MODE | STIRRING OPERATION MODE |
|---|---|---|---|
| WATER FEED CUTOFF VALVE 25a | O (×) | × | × |
| WATER FEED CUTOFF VALVE 25b | × (O) | × | × |
| CIRCULATION CUTOFF VALVE 26 | O | × | × |
| REVERSE FLOW CUTOFF VALVE 27a | × | O (×) | × |
| REVERSE FLOW CUTOFF VALVE 27b | × | × (O) | × |
| WATER SUPPLY VALVE 28 | × | O | O |
| STIRRING LINE VALVE 30a | × | × | O (×) |
| STIRRING LINE VALVE 30b | × | × | × (O) |

(O → OPENED, × → CLOSED)

SLAG DISCHARGE SYSTEM, GASIFIER PROVIDED WITH SAME, AND METHOD FOR OPERATING SLAG DISCHARGE SYSTEM

TECHNICAL FIELD

The present invention relates to a slag discharge system of a gasifier which thermally decomposes carbonaceous feedstock such as coal, thereby gasifying it, a gasifier provided with the slag discharge system, and a method for operating the slag discharge system.

BACKGROUND ART

In a gasifier which produces combustible gas by thermally decomposing carbonaceous feedstock such as coal, biomass fuel such as a wood pellet, or petroleum coke, ashes of the carbonaceous feedstock melt and accumulate as slag in a slag bath provided at a bottom portion of the gasifier. Slag cooling water is stored in the slag bath, and the slag falls into the slag cooling water, thereby being rapidly cooled and solidified, and is crushed.

The slag solidified and crushed in this manner and collected in the slag bath is discharged to the outside of the system of the gasifier via a lock hopper provided outside the gasifier. The slag has higher density than the slag cooling water, and therefore, in the related art, when the slag is moved from the slag bath to the lock hopper, the slag naturally drops due to gravity. For example, PTL 1 discloses a slag discharge system in which a lock hopper is disposed below a gasifier.

However, according to the slag discharge system described above, in order to provide the lock hopper below the gasifier, the disposition position of the gasifier becomes higher. Therefore, the height from the installation surface of a plant to an upper part of the gasifier is increased. The disposition position of the gasifier becomes higher, so that the disposition positions of a support frame supporting the gasifier, an operation table, or the like become higher.

Therefore, a slag discharge system as disclosed in PTL 2 has been proposed. In this slag discharges system, a lock hopper is disposed by the side of a gasifier, a slag discharge line communicating with the lock hopper is provided from a slag bath of a bottom portion of the gasifier, a water stream from the slag bath to the lock hopper is formed in the slag discharge line by a circulation pump, and slag in the slag bath is discharged to the lock hopper by this water stream.

In this way, the slag can be transferred from the slag bath to the lock hopper by being carried by a flow of slag cooling water, and therefore, the lock hopper can be disposed by the side of the gasifier, so that the height from the installation surface of a plant to an upper part of the gasifier can be reduced.

CITATION LIST

Patent Literature

[PTL 1] Japanese Unexamined Patent Application Publication No. 2011-74274
[PTL 2] Japanese Patent No. 5743093

SUMMARY OF INVENTION

Technical Problem

As described above, in the slag discharge system of the related art disclosed in PTL 2, the slag which has fallen into the slag bath of the bottom portion of the gasifier is sucked out together with the slag cooling water stored in the slag bath through the slag discharge line. A slag suction port of the slag discharge line which sucks the slag out from the slag bath faces vertically downward and opens toward the bottom surface of the slag bath.

During a normal operation of the gasifier, the slag falling into the slag bath is sequentially sucked out through the slag suction port of the slag discharge line and discharged, and therefore, there is no case where the slag accumulates in the slag suction port. However, at the time of the start-up of the gasifier or after temporary shut-down of the gasifier, there is a case where a state where the slag accumulates up to above the slag suction port is created. In a case where slag suction from the slag discharge line is restarted in this state, the density of the slag is too high, so that there is a concern that the slag discharge line may be clogged and blocked. There is also a concern that the slag discharge line may be blocked by the slag which remains in the slag discharge line. An event in which the slag discharge line is blocked in this manner easily occurs mainly at the start-up of the slag discharge system, thereby hindering the operation of the gasifier.

The present invention has been made to solve the above problem and has an object to provide a slag discharge system, a gasifier provided with the slag discharge system, and a method for operating the slag discharge system, in which it is possible to suppress or eliminate a blockage of a slag suction port for sucking slag out from a bottom portion of a gasifier by the slag and smoothly perform an operation of the gasifier, with a simple configuration.

Solution to Problem

In order to solve the above problem, the present invention adopts the following means.

That is, according to a first aspect of the present invention, there is provided a slag discharge system including: a slag bath which is provided at a bottom portion of a gasifier for gasifying carbonaceous feedstock to receive slag generated from the carbonaceous feedstock and store slag cooling water for rapidly cooling the slag; a slag suction port which sucks out the slag accumulated on a bottom portion of the slag bath together with the slag cooling water; a slag cooling water feed line for transporting the slag and the slag cooling water sucked out through the slag suction port to the outside of the slag bath; a slag separation device which is connected to the slag cooling water feed line and separates the slag included in the slag cooling water; a slag cooling water circulation line for circulating the slag cooling water from the slag separation device to the slag bath; a circulation pump which is connected to the slag cooling water circulation line and forms a water stream for sucking the slag and the slag cooling water out through the slag suction port; a reverse flow line having one end connected to the slag cooling water feed line, and the other end connected to a downstream side of the circulation pump in the slag cooling water circulation line; a selective supply unit which makes it possible to selectively supply the slag cooling water discharged from the circulation pump to the slag cooling water circulation line and the reverse flow line; a water supply line having one end connected to a section adjacent to the slag separation device in the slag cooling water feed line or the slag cooling water circulation line; and a water supply valve provided in the water supply line.

According to the slag discharge system having the above configuration, if the selective supply unit is operated such that the slag cooling water discharged from the circulation pump flows to the slag bath through the slag cooling water circulation line, a water stream from the slag suction port to the slag separation device is formed in the slag cooling water feed line. For this reason, the slag accumulated on the bottom portion of the slag bath is sucked out together with the slag cooling water through the slag suction port and is sent to the slag separation device via the slag cooling water feed line, so that the slag discharge system enters a normal operation mode.

Further, if the selective supply unit is operated such that the slag cooling water discharged from the circulation pump flows to the reverse flow line side, the slag cooling water discharged from the circulation pump reversely flows into the slag bath via the reverse flow line and the slag cooling water feed line, so that the slag discharge system enters a reverse flow operation mode. For this reason, the interior of an upstream-side portion of the slag cooling water feed line is backwash-purged.

Therefore, even if the slag accumulates around the slag suction port or the slag remains in the interior of the slag cooling water feed line, the slag which remains flows to be returned to the slag bath side by the reverse flow of the slag cooling water, so that a blockage of the slag suction port and the slag cooling water feed line can be suppressed or eliminated.

In the reverse flow operation mode, the water supply valve is opened, whereby water is supplied from the water supply line to the section adjacent to the slag separation device in the slag cooling water feed line or the slag cooling water circulation line. As this water, the slag cooling water stored in the slag bath or external water which is introduced from the outside of the system can be considered. For this reason, the suction side of the circulation pump is prevented from becoming a vacuum, and the water discharged from the circulation pump is made to reversely flow from the reverse flow line to the slag cooling water feed line side, and thus it is possible to reliably eliminate the blockage of the slag suction port and the slag cooling water feed line.

The reverse flow line is a single pipe which connects the section from the slag suction port to the slag separation device in the slag cooling water feed line and the downstream side of the circulation pump in the slag cooling water circulation line in a bypass manner, and therefore, the reverse flow line can be easily disposed. Further, the selective supply unit can be relatively easily configured by combining a plurality of cutoff valves or using a multi-way valve. Moreover, the backwash-purging of the slag cooling water feed line using the reverse flow line is completed in a short time, and therefore, it is not necessary to execute the reverse flow operation mode over a long period of time and there is no case where the operation of the gasifier is interrupted.

In the slag discharge system having the above configuration, the water supply line may have a configuration in which the slag cooling water stored in the slag bath is supplied thereto from the other end thereof.

In this way, at the time of the reverse flow operation, the water supply valve is opened, whereby the slag cooling water stored in the slag bath is supplied to the circulation pump via the water supply line. In this way, it is possible to perform the reverse flow operation by effectively using the slag cooling water in the system without drawing external water from the outside of the system.

In the slag discharge system in which the slag cooling water stored in the slag bath is supplied from the water supply line, as described above, the one end of the water supply line may be connected to the downstream side of the slag separation device.

In this way, even in a case where the slag separation device has stopped due to a failure or the like, the reverse flow operation can be performed.

In the slag discharge system in which the slag cooling water stored in the slag bath is supplied from the water supply line, as described above, the one end of the water supply line may be connected to the upstream side of the slag separation device.

In this way, at the time of the reverse flow operation, the slag cooling water stored in the slag bath passes through the slag separation device, whereby coarse-grained slag is separated from the slag cooling water, and thereafter, the slag cooling water is supplied to the circulation pump. Therefore, wear of or damage to the circulation pump and piping can be prevented.

The water supply line may be connected such that the other end thereof merges with the vicinity of a connection portion to the slag bath in the slag cooling water circulation line.

In this way, when the other end of the water supply line is connected to the slag bath, it is possible to perform the connection by using the existing piping without newly drilling the gasifier and the slag bath. For this reason, it is easy to dispose the water supply line.

In the slag discharge system having the above configuration, the gasifier may have a combustion part which burns the carbonaceous feedstock to gasify the carbonaceous feedstock, the slag bath may have an inner vessel having an inner space communicating with the combustion part in an interior thereof, and an outer vessel covering the inner vessel, and the other end of the water supply line may be located in an outer space between the inner vessel and the outer vessel.

The slag which is produced when the carbonaceous feedstock burns in the combustion part is supplied to the inner space which communicates with the combustion part. In this way, the slag does not almost exist in the outer space separated from the inner space by the inner vessel.

In the above configuration, the other end of the water supply line is located in the outer space, and the slag cooling water stored in the outer space is supplied to the water supply line. In this way, even if one end of the water supply line is connected to the downstream side of the slag separation device, the slag cooling water in which the slag is not almost included can be supplied to the circulation pump. In this manner, the slag cooling water in which the slag is not almost included can be supplied to the circulation pump without passing through the slag separation device, and therefore, even in a case where the slag separation device has stopped due to a failure or the like, it is possible to perform the reverse flow operation and to prevent wear of or damage to the circulation pump and piping by the slag.

In the slag discharge system having the above configuration, the selective supply unit may be configured to include a water feed cutoff valve provided further toward a downstream side than a connection portion of the reverse flow line in the slag cooling water feed line, and a reverse flow cutoff valve provided in the reverse flow line.

The selective supply unit has the above configuration, whereby, if the water feed cutoff valve is opened and the reverse flow cutoff valve is closed, the normal operation mode is established, and if the water supply cutoff valve is closed and the reverse flow cutoff valve is opened, the reverse flow operation mode is established. With this configuration, the selective supply unit can be made so as to have a simple and highly reliable configuration.

The selective supply unit may further include a circulation cutoff valve provided further toward a downstream side than the connection portion of the reverse flow line in the slag cooling water circulation line.

If the selective supply unit has the above configuration, at the time of the execution of the reverse flow operation mode, the circulation cutoff valve is closed or has a reduced degree of opening, whereby it is possible to cause the slag cooling water or the external water discharged from the circulation pump to preferentially flow to the reverse flow line. In this way, it is possible to reliably and quickly eliminate the blockage of the slag suction port and the slag cooling water feed line.

Switching means for switching between sending a fluid flowing in from the reverse flow line to the slag suction port side and sending the fluid to the slag separation device side may be provided in the slag cooling water feed line.

If the switching means is provided in the slag cooling water feed line, as in the above configuration, by the switching of the switching means, it is possible to select whether to supply the fluid (for example, the slag cooling water or the external water) flowing from the reverse flow line into the slag cooling water feed line to the slag suction port or to supply the fluid to the slag separation device.

Therefore, in a case where the slag accumulates around the slag suction port or the slag remains in the interior of the slag cooling water feed line, if the switching means is switched so as to supply the fluid flowing through the reverse flow line to the slag suction port, the slag which remains flows to be returned to the slag bath side by the fluid which is supplied to the slag suction port, whereby it is possible to suppress or eliminate the blockage of the slag suction port and the slag cooling water feed line.

Further, in a case where a blockage has occurred in the interior of the slag separation device due to the slag, if the switching means is switched so as to supply the fluid flowing through the reverse flow line to the slag separation device, the slag which is a cause of the blockage is swept away by the fluid which is supplied to the slag separation device, and thus it is possible to eliminate the blockage of the interior of the slag separation device.

The slag discharge system may have a configuration in which it further includes a control unit which controls the selective supply unit and the water supply valve. In this way, it is possible to automatically perform switching between the normal operation mode and the reverse flow operation mode.

In the slag discharge system having the above configuration, the slag discharge system may further include a pressure gauge which measures pressure on the suction side of the circulation pump, and the control unit may control the selective supply unit such that the slag cooling water discharged from the circulation pump flows to the slag bath via the reverse flow line, when pressure data measured by the pressure gauge exceeds a predetermined threshold value.

At the time of the start-up of the gasifier or during the operation (the normal operation mode), if the slag accumulates around the slag suction port or in the interior of the slag cooling water feed line, so that there is a tendency to a blockage, the pressure on the suction side of the circulation pump is lowered. If the pressure data exceeds a predetermined threshold value, the control unit controls the selective supply unit, thereby creating the reverse flow operation mode in which the slag cooling water discharged from the circulation pump reversely flows to the slag bath via the reverse flow line. For this reason, the blockage of the slag suction port and the slag cooling water feed line due to accumulation of the slag is suppressed or eliminated.

In this way, with a simple configuration in which the pressure gauge is provided on the suction side of the circulation pump and the pressure data thereof is input to the control unit to cause the control unit to control the selective supply unit, it is possible to automatically suppress or eliminate the blockage of the slag suction port and the slag cooling water feed line.

In the slag discharge system having the above configuration, the slag bath may have a plurality of slag pots provided side by side in an interior thereof, a plurality of the slag suction ports may be provided corresponding to the plurality of slag pots, an upstream-side section of the slag cooling water feed line may branch into a plurality of water feed branch lines which are respectively connected to the plurality of slag suction ports, and the selective supply unit may have a configuration in which it can selectively supply the slag cooling water or the external water which is supplied from the reverse flow line to the plurality of water feed branch lines.

According to the above configuration, in the normal operation mode of the slag discharge system, the slag pot on one side is used and the slag pot on the other side is made to be in a standby state. Then, when a predetermined operation time has elapsed and the water feed branch line on one side, which sucks the slag out from the slag pot on one side, has a tendency to a blockage by the slag, the selective supply unit is switched such that the slag pot on one side is in a standby state and the slag in the slag pot on the other side is sucked out through the water feed branch line on the other side.

When this switching operation is performed, the selective supply unit is operated so as to make the slag cooling water discharged from the circulation pump temporarily flow from the reverse flow line to the water feed branch line on the other side, and thus the interior of the water feed branch line on the other side is backwash-purged toward the slag pot. That is, the operation mode is temporarily switched to the reverse flow operation mode.

In this way, even if the slag accumulates or remains in the interior of the water feed branch line on the other side, which is in a standby state, the slag which remains flows to be returned to the slag pot side, so that a possibility of a blockage of the water feed branch line is eliminated, and thereafter, the slag of the slag pot on the other side is sucked out through the water feed branch line, so that the normal operation can be continued. Even when the operation is switched from the slag pot on the other side to the slag pot on one side, similarly, backwash-purging of the water feed branch line is performed.

In this manner, by alternately using the plurality of slag pots and performing the backwash-purging of the water feed branch line by temporarily switching to the reverse flow operation mode before the alternation, it is possible to smoothly perform a continuous operation without interrupting the operation of the gasifier.

In the slag discharge system having the above configuration, a plurality of the slag suction ports may be provided with respect to a single slag bath. In this way, the ratio of the suction area of the slag suction ports to the planar area of the slag bath increases, and therefore, it is possible to reduce a probability that the slag suction ports are blocked by the slag or to prolong a time until the slag suction ports are blocked.

In the slag discharge system having the above configuration, the slag discharge system may have a configuration in which it further includes a stirring line which branches off from the slag cooling water circulation line and is connected to the bottom portion of the slag bath, and a stirring line valve connected to the stirring line.

According to the above configuration, the stirring line valve is opened, whereby the slag cooling water discharged from the circulation pump is injected from the bottom portion of the slag bath via the stirring line, and thus the slag discharge system enters a stirring operation mode. In this way, the slag accumulated on the bottom portion of the slag bath is stirred and diluted to be fluidized and is easily sucked out through the slag suction port, so that the blockage of the slag suction port and the slag cooling water feed line can be suppressed or eliminated. The stirring and the dilution of the slag using this stirring line are also completed in a short time, and therefore, it is not necessary to execute the stirring operation mode over a long period of time and there is no case where the operation of the gasifier is interrupted.

In the slag discharge system having the above configuration, the stirring line may be provided with a plurality of connection portions to the bottom portion of the slag bath. In this way, the slag accumulated on the bottom portion of the slag bath is more widely stirred and fluidized, and thus it is possible to suppress or eliminate the blockage of the slag suction port and the slag cooling water feed line.

In the slag discharge system having the above configuration, the slag bath may have a plurality of slag pots provided side by side in an interior thereof, a downstream-side section of the stirring line may branch into a plurality of stirring branch lines which are respectively connected to the plurality of slag pots, and the stirring line valve may have a configuration in which it can selectively supply the slag cooling water which is supplied from the stirring line to the plurality of stirring branch lines.

According to the above configuration, in a case where the plurality of slag pots are alternately used as described above, it is possible to execute the reverse flow operation mode in which the backwash-purging of the slag cooling water feed line is performed by using the reverse flow line and to execute the stirring operation mode in which the stirring line valves are opened, whereby the slag cooling water or the external water discharged from the circulation pump is injected from the plurality of stirring branch lines to the bottom portions of the respective slag pots. In this way, the slag accumulated on the bottom portion of each slag pot is stirred and diluted to be fluidized, and thus the blockage of the slag suction port and the slag cooling water feed line can be suppressed and eliminated.

In the slag discharge system having the above configuration, the slag discharge system may have a configuration in which it further includes a pressure gauge which measures pressure on the suction side of the circulation pump, and a control unit which controls the stirring line valve together with the selective supply unit such that the slag cooling water discharged from the circulation pump is supplied to the slag bath via the stirring line, when pressure data measured by the pressure gauge exceeds a predetermined threshold value.

According to the above configuration, at the time of the execution of the normal operation mode or the time of the execution of the reverse flow operation mode, it is possible to execute the stirring operation mode in which the slag cooling water or the external water discharged from the circulation pump is injected from the stirring line to the bottom portion of the slag bath. In this way, the slag accumulated on the bottom portion of the slag bath is stirred and diluted to be fluidized and is easily sucked out through the slag suction port, and thus the blockage of the slag suction port and the slag cooling water feed line can be reliably suppressed or eliminated.

According to a second aspect of the present invention, there is provided a gasifier including the slag discharge system according to any one of the above, and according to this gasifier, various operations and effects described above can be exhibited.

According to a third aspect of the present invention, there is provided a method for operating a slag discharge system which sucks out slag received in a slag bath of a bottom portion of a gasifier for gasifying carbonaceous feedstock together with slag cooling water through a slag suction port by a circulation pump and sends the slag and the slag cooling water to a slag separation device through a slag cooling water feed line, the method including a reverse flow step of sending the slag cooling water which is discharged from the circulation pump to the slag cooling water feed line to make the slag cooling water reversely flow from the slag suction port into the slag bath, when the slag suction port has been blocked by the slag or when there is a sign of blockage.

According to the method for operating a slag discharge system, at the time of the execution of the reverse flow step, the slag cooling water which is discharged from the circulation pump reversely flows to the slag cooling water circulation line. This reverse flow may be temporary. In this way, the interior of the slag cooling water circulation line is backwash-purged towards the slag bath. Therefore, in a case where the slag accumulates around the slag suction port or in the interior of the slag cooling water feed line, the accumulated slag flows to be returned to the slag bath side, whereby the blockage of the slag suction port and the slag cooling water feed line can be suppressed or eliminated.

In the method for operating a slag discharge system, the method may further include a stirring step of injecting the slag cooling water discharged from the circulation pump from a bottom portion of the slag bath into the slag bath, when the slag suction port has been blocked by the slag or when there is a sign of blockage.

According to the method for operating a slag discharge system, at the time of the execution of the stirring step, the slag cooling water which is discharged from the circulation pump is injected from the bottom portion of the slag bath into the slag bath. This injection may be temporary. In this way, the slag accumulated on the bottom portion of the slag bath is stirred and diluted to be fluidized and is easily sucked out through the slag suction port, and thus the blockage of the slag suction port and the slag cooling water feed line can be suppressed or eliminated.

In the method for operating a slag discharge system, the method may further include a pressure measurement step of measuring pressure on a suction side of the circulation pump, and a blockage determination step of determining a blocked state of the slag suction port, based on pressure data measured in the pressure measurement step, and in the blockage determination step, when the pressure data measured in the pressure measurement step exceeds a predetermined threshold value, the reverse flow step or the stirring step may be executed.

At the time of the start-up of the gasifier or during the operation (the normal operation mode), if the slag accumulates around the slag suction port or in the interior of the slag cooling water feed line, so that there is a tendency to a blockage, the pressure on the suction side of the circulation pump is lowered.

Therefore, by executing the pressure measurement step of measuring this pressure, in the blockage determination step, it can be determined that the slag suction port has been blocked or is being blocked. Then, in a case where the pressure on the suction side of the circulation pump is lowered upto a predetermined threshold value, in the blockage determination step, it is determined that the slag suction port has been blocked, and the reverse flow step or the stirring step is then executed. According to this operation method, it is possible to automatically suppress or eliminate the blockage of the slag suction port with a simple configuration.

According to a fourth aspect of the present invention, there is provided a method for operating a slag discharge system which sucks out slag received in a slag bath of a bottom portion of a gasifier for gasifying carbonaceous feedstock together with slag cooling water through a slag suction port by a circulation pump and sends the slag and the slag cooling water to a slag separation device through a slag cooling water feed line, the method including a separation device cleaning step of sending a fluid discharged from the circulation pump to the slag cooling water feed line to be supplied from the slag cooling water feed line to the slag separation device, when a blockage by the slag has occurred in an interior of the slag separation device or when there is a sign of the blockage.

According to the method for operating a slag discharge system, at the time of the execution of the separation device cleaning step, the fluid which is discharged from the circulation pump is supplied to the slag separation device. This supply may be temporary. In this way, the slag which causes a blockage in the interior of the slag separation device is swept away, and thus it is possible to eliminate the blockage of the interior of the slag separation device.

Advantageous Effects of Invention

As described above, according to the slag discharged system, the gasifier provided with the slag discharged system, and the method for operating the slag discharged system according to the present invention, it is possible to suppress or eliminate the blockage of the slag suction port for sucking slag out from the bottom portion of the gasifier by the slag and smoothly perform an operation of the gasifier, with a simple configuration.

BRIEF DESCRIPTION OF DRAWINGS

FIG. 5 is a table showing a correlation between an operation mode and an open/closed state of each valve in the second embodiment.

DESCRIPTION OF EMBODIMENTS

Hereinafter, embodiments of the present invention will be described with reference to the drawings.

First Embodiment

Figure 1:
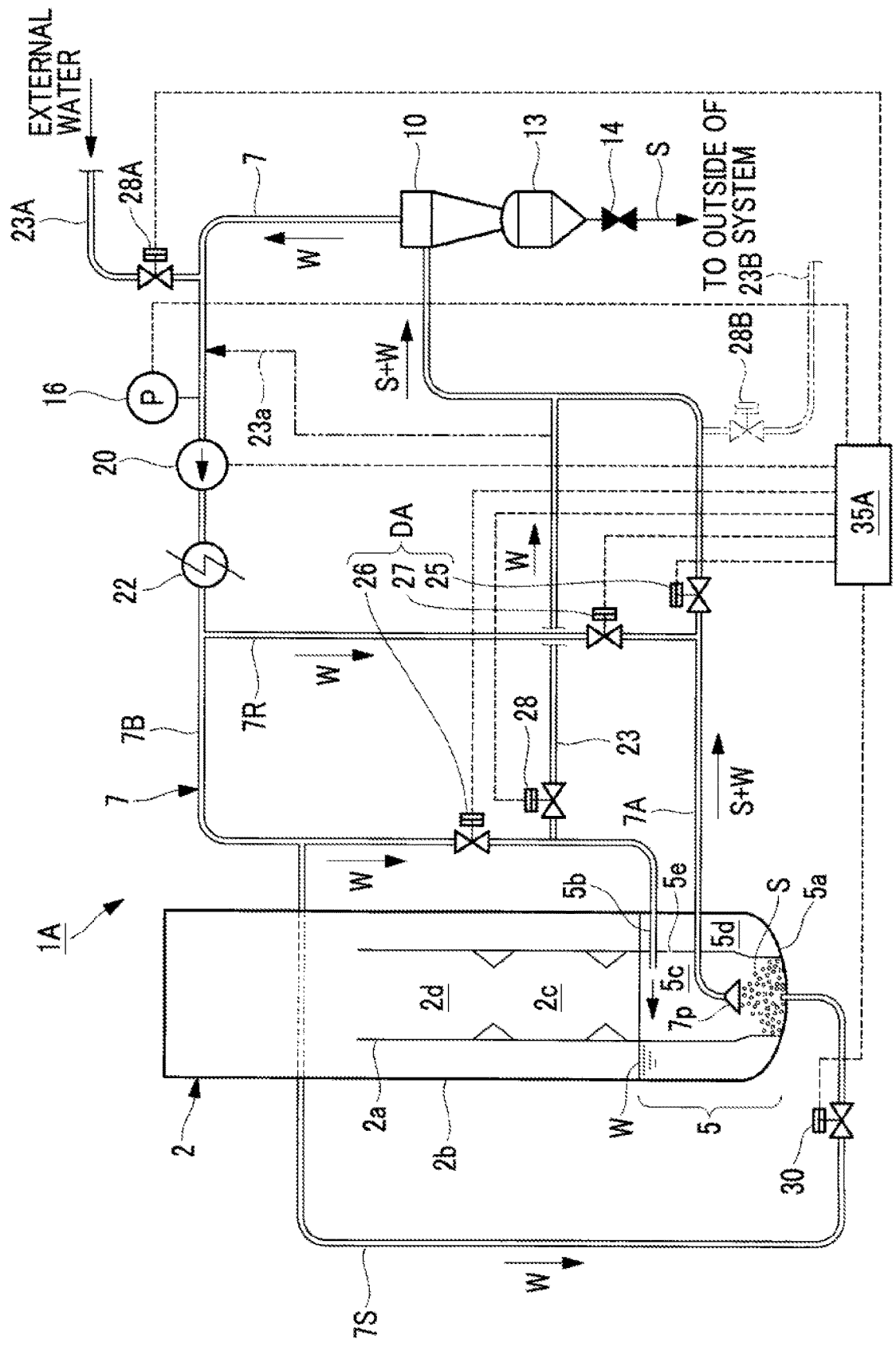
FIG. 1 is a schematic configuration diagram of a gasifier and a slag discharge system showing a first embodiment of the present invention.

FIG. 1 is a schematic configuration diagram of a gasifier and a slag discharge system showing a first embodiment of the present invention. A slag discharge system 1A of this embodiment is provided at a gasifier 2 in which pulverized coal obtained by pulverizing coal (carbonaceous feedstock) with a mill or the like is charged into a furnace together with a gasifying agent such as air or oxygen and thermally decomposed to be gasified, for example, in an integrated coal gasification combined cycle (IGCC). The gasifier may be replaced by a gasifier which gasifies other carbonaceous feedstock such as thinned wood, waste wood, driftwood, grasses, wastes, sludge, biomass fuel such as an old tire, or the like, for example, without being limited to coal. Further, the slag discharge system 1A is not limited to a power generation plant and can also be applied to a gasifier or the like in a chemical plant, for example.

The gasifier 2 is, for example, a pressurized entrained flow gasifier and is provided with a substantially cylindrical inner vessel 2a and a substantially cylindrical outer vessel 2b concentrically surrounding the inner vessel 2a. A combustor (a combustion part) 2c which burns some of pulverized coal to obtain the amount of heat necessary for gasification reaction, and a reductor (a combustion part) 2d which obtains the amount of heat from the combustor 2c and gasifies the pulverized coal are disposed in two stages, one above the other, in the interior of the inner vessel 2a. That is, in the gasifier 2, combustion and gasification of the pulverized coal are performed in the interior of the inner vessel 2a.

A slag bath 5 is provided at a bottom portion of the gasifier 2 and slag cooling water W is stored in the interior thereof. The slag bath 5 is partitioned into an inner space 5c which is located in the interior of the inner vessel 2a, and an outer space 5d formed between the outer peripheral surface of the inner vessel 2a and the inner peripheral surface of the outer vessel 2b. The inner space 5c communicates with a space in which the combustor 2c and the reductor 2d are disposed. A communication hole 5e is provided in the inner vessel 2a, and the inner space 5c and the outer space 5d communicate with each other by the communication hole 5e. The communication hole 5e is located below the water surface of the slag cooling water W which is stored in the slag bath 5 during an operation of the gasifier 2. That is, during the operation of the gasifier 2, the slag cooling water W can move between the inside of the inner space 5c and the inside of the outer space 5d through the communication hole 5e. In this way, the water surface of the slag cooling water W which is stored in the inner space 5c and the water surface of the slag cooling water W which is stored in the outer space 5d are kept constant.

Ashes in the pulverized coal charged into the gasifier 2 are melted in the combustor 2c, and then fall, as a liquid molten slag S, into the slag cooling water W stored in the inner space 5c of the slag bath 5 through slag holes (not shown) in a lower part of the combustor 2c by gravity, are rapidly cooled, thereby being solidified, are crushed, and discharged to the outside of the system of the gasifier 2 by the slag discharge system 1A. That is, the slag S accumulates in the inner space 5c of the slag bath 5 and hardly accumulates in the outer space 5d. The slag discharge system 1A is configured as follows.

A slag line 7 is connected to the inner space 5c of the slag bath 5. The slag line 7 is configured to include a slag cooling water feed line 7A for discharging the crushed slag S from a bottom portion 5a of the slag bath 5, a slag cooling water circulation line 7B having one end connected to the slag cooling water feed line 7A through a slag separation device 10, and the other end connected to the slag bath 5, and a reverse flow line 7R.

An upstream end of the slag cooling water feed line 7A is a slag suction port 7p, and the slag suction port 7p is located in the inner space 5c of the slag bath 5. Further, the slag suction port 7p is spaced apart upward from the bottom portion 5a of the slag bath 5 and is open vertically downward. Slag slurry S+W which is a mixture of the crushed slag S and the slag cooling water W in the inner space 5c of the slag bath 5 is sucked out through the slag suction port 7p. A pressure equal to the operating pressure of the gasifier 2 acts on the interior of the slag line 7.

The slag separation device 10 connected to the middle of the slag line 7 is for separating the slag S from the slag slurry, and for example, a centrifugal separator (a liquid cyclone or the like) is suitable. However, filtration type separation means such as a strainer or a filter may be used. The slag slurry sucked out through the slag suction port 7p is transferred to the slag separation device 10 by a water stream flowing through the slag cooling water feed line 7A.

A lock hopper 13 and a discharge valve 14 are connected to a lower part of the slag separation device 10. The lock hopper 13 is a hopper for storing a predetermined amount of slag S separated from the slag cooling water W in the slag separation device 10, and the discharge valve 14 is periodically opened to discharge the slag. The discharged slag S is carried out to the outside of the system of the gasifier 2 by a transportation vehicle (not shown) or the like.

A pressure gauge 16, a circulation pump 20, and a cooler 22 are connected in this order to the downstream side of the slag separation device 10 in the slag cooling water circulation line 7B. A downstream end of the slag cooling water circulation line 7B in the flow of the slag cooling water W in a normal operation mode (described later) is connected to a return flow part 5b provided at a height equivalent to a shallow portion of the slag cooling water W in the slag bath 5. That is, the slag line 7 is configured as a loop-shaped pipe line which extends from the inner space 5c of the slag bath 5 and is connected to the return flow part 5b in the inner space 5c of the slag bath 5 again.

In the slag line 7 disposed in the form of a loop in this manner, the slag cooling water feed line 7A configuring the section from the slag suction port 7p to the slag separation device 10, and the downstream side of the circulation pump 20 in the slag cooling water circulation line 7B configuring the section from the circulation pump 20 to the return flow part 5b of the slag bath 5 are connected to each other in a bypass manner by the reverse flow line 7R.

A water feed cutoff valve 25 is connected to the downstream side of a connection portion with the reverse flow line 7R in the slag cooling water feed line 7A, and a circulation cutoff valve 26 is connected to the downstream side of a connection portion with the reverse flow line 7R in the slag cooling water circulation line 7B. Further, a reverse flow cutoff valve 27 is connected to the reverse flow line 7R.

One end of a water supply line 23 is connected to a section adjacent to the slag separation device 10 in the slag cooling water feed line 7A or the slag cooling water circulation line 7B. In this embodiment, one end (the right end in FIG. 1) of the water supply line 23 is connected to the upstream side of the slag separation device 10 in the slag cooling water feed line 7A. The other end (the left end in FIG. 1) of the water supply line 23 is connected to the vicinity of a connection portion to the slag bath 5 in the slag cooling water circulation line 7B, that is, to the section between the circulation cutoff valve 26 and the return flow part 5b of the slag bath 5. In this way, the slag cooling water W stored in the slag bath 5 is supplied from the other end of the water supply line 23. A water supply valve 28 is connected to the water supply line 23.

One end (the right end in FIG. 1) of the water supply line 23 may be connected to the upstream side of the slag separation device 10 (the section between the water feed cutoff valve 25 and the slag separation device 10), as described above, or may be connected to the downstream side of the slag separation device 10 (the section between the slag separation device 10 and the circulation pump 20), as indicated by reference numeral 23a in FIG. 1.

Further, other water supply lines 23A and 23B which makes it possible to supply external water from the outside of the system of the slag line 7 may be provided together with the water supply line 23. For example, the water supply line 23A is connected to the section between the slag separation device 10 and the circulation pump 20 and provided with a water supply valve 28A, and the water supply line 23B is connected to the section between the water feed cutoff valve 25 and the slag separation device 10 and provided with a water supply valve 28B.

The water feed cutoff valve 25, the circulation cutoff valve 26, the reverse flow cutoff valve 27, the water supply valves 28, 28A, and 28B may be valves which are opened and closed manually. However, in this embodiment, the valves are electromagnetic valves, the opening and closing of which is electrically controlled by a control unit 35A.

A selective supply unit DA is configured with each of the cutoff valves 25, 26, and 27 described above. The selective supply unit DA makes it possible to selectively supply the slag cooling water W discharged from the circulation pump 20 (or external water supplied from the water supply lines 23A and 23B) to either the return flow part 5b or the slag suction port 7p.

On the other hand, a stirring line 7S which branches off from the section between the circulation pump 20 and the return flow part 5b in the slag cooling water circulation line 7B and is connected to the bottom portion 5a of the slag bath 5 is disposed, and a stirring line valve 30 is connected to the stirring line 7S. The stirring line valve 30 is also an electromagnetic valve, the opening and closing of which is electrically controlled by the control unit 35A.

Figures 2, 3:
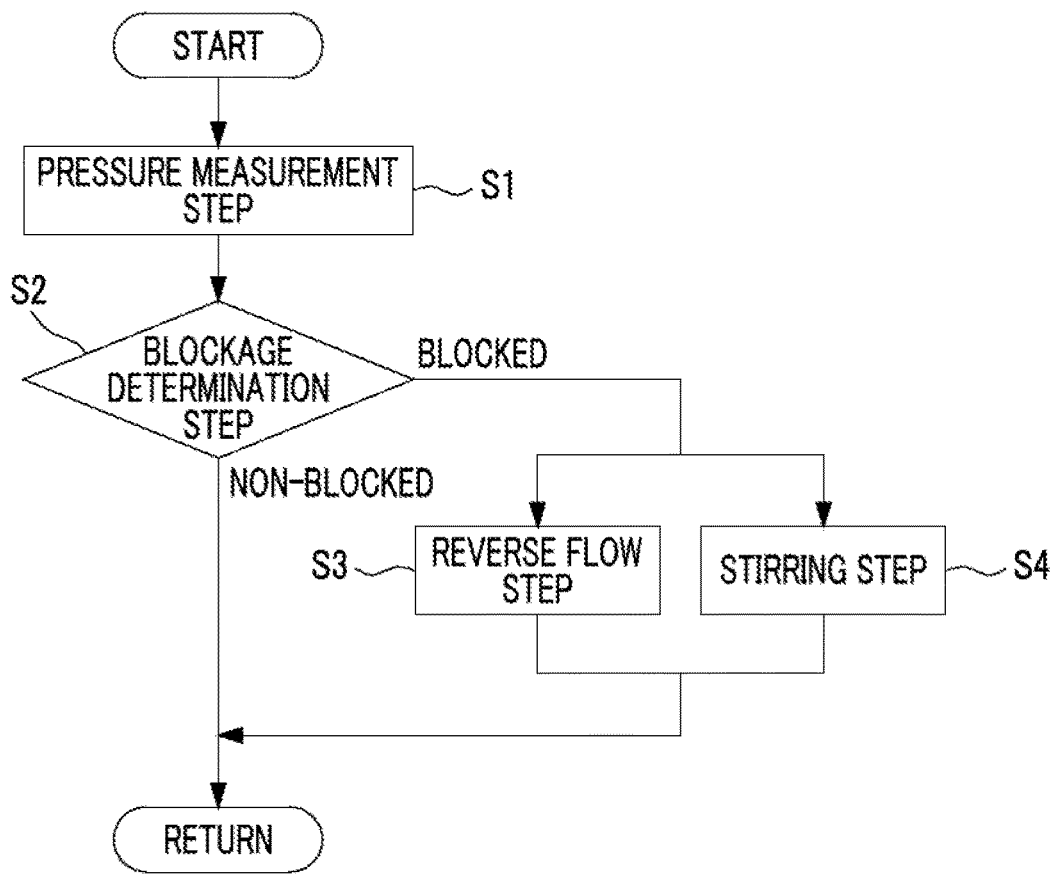
FIG. 2 is a table showing a correlation between an operation mode and an open/closed state of each valve in the first embodiment.
FIG. 3 is a flowchart showing a flow of operation control of a slag discharge system according to the present invention.

The slag discharge system 1A configured as described above has three operation modes; a "normal operation mode", a "reverse flow operation mode", and a "stirring operation mode", as shown in the table of FIG. 2.

In the normal operation mode, the control unit 35A operates the selective supply unit DA and the stirring line valve 30 such that the slag cooling water W discharged from the circulation pump 20 flows to the return flow part 5b of the slag bath 5 through only the slag cooling water circulation line 7B without passing through the reverse flow line 7R and the stirring line 7S. That is, as shown in FIG. 2, the water feed cutoff valve 25 and the circulation cutoff valve 26 are opened and the reverse flow cutoff valve 27 and the stirring line valve 30 are closed. The water supply valve 28 is also closed. In this way, a water stream from the slag suction port 7p to the slag separation device 10 is formed in the slag line 7, and thus the slag slurry S+W accumulated on the bottom portion 5a of the slag bath 5 is sucked out through the slag suction port 7p of the slag cooling water feed line 7A and sent to the slag separation device 10.

In the slag separation device 10, the slag S is separated from the slag cooling water W and then stored in the lock hopper 13, and discharged periodically from the discharge valve 14 to be carried out to the outside of the system of the gasifier 2. Then, only the slag cooling water W from which the slag S has been removed is sucked and discharged by the circulation pump 20, passes through the slag cooling water circulation line 7B, is further cooled to a predetermined temperature in the cooler 22, and is then returned to the inner space 5c of the slag bath 5 via the return flow part 5b. The returned slag cooling water W is sucked out through the slag suction port 7p of the slag cooling water feed line 7A again together with the slag S accumulated on the bottom portion 5a of the inner space 5c of the slag bath 5 and is sent to the slag separation device 10.

Further, in the reverse flow operation mode, the control unit 35A operates the selective supply unit DA, the water supply valve 28, and the stirring line valve 30 such that the slag cooling water W discharged from the circulation pump 20 flows to the reverse flow line 7R side. That is, as shown in FIG. 2, the water feed cutoff valve 25, the circulation cutoff valve 26, and the stirring line valve 30 are closed and the reverse flow cutoff valve 27 and the water supply valve 28 are opened. The water supply valve 28A (28B) of the water supply line 23A (23B) is also opened as necessary.

In this way, the slag cooling water W (the external water) discharged from the circulation pump 20 reversely flows into the slag bath 5 via the reverse flow line 7R and the slag cooling water feed line 7A. For this reason, the interior of the upstream-side portion of the slag cooling water feed line 7A is backwash-purged, and thus even if the slag S accumulates around the slag suction port 7p or the slag S remains in the interior of the slag cooling water feed line 7A, the slag S flows to be returned to the slag bath 5 side by the reverse flow of the slag cooling water W or the external water, whereby the blockage of the slag cooling water feed line 7A is suppressed or eliminated.

In this reverse flow operation mode, the water supply valve 28 is opened, whereby the slag cooling water W stored in the inner space 5c of the slag bath 5 is supplied to the circulation pump 20 via the water supply line 23 and the slag line 7 (7A, 7B). For this reason, the suction side of the circulation pump 20 is prevented from becoming a vacuum, and the slag cooling water W (the external water) discharged from the circulation pump 20 is made to reversely flow from the reverse flow line 7R to the slag cooling water feed line 7A side, and thus it is possible to reliably eliminate the blockage of the slag suction port 7p and the slag cooling water feed line 7A.

By providing the water supply line 23 for supplying the slag cooling water W stored in the slag bath 5 to the suction side of the circulation pump 20 in the reverse flow operation mode, it is possible to perform a reverse flow operation by effectively using the slag cooling water W in the system without drawing in a large amount of external water from the outside of the system of the slag line 7 or without drawing in external water at all.

In this embodiment, in the reverse flow operation mode, the slag cooling water W stored in the inner space 5c of the slag bath 5 is extracted, and therefore, there is a possibility that the slag S may be mixed in the slag cooling water W. However, one end of the water supply line 23 is connected to the upstream side of the slag separation device 10, whereby the slag cooling water W passes through the slag separation device 10 during the reverse flow operation, and thus the slag cooling water W with coarse-grained slag separated therefrom is supplied to the circulation pump 20. For this reason, wear of or damage to the circulation pump 20 and piping (7A, 7B, and 7R) can be prevented. In this embodiment, the return flow part 5b for extracting the slag cooling water W is provided at a height equivalent to the shallow portion of the slag cooling water W, and therefore, it becomes difficult for the accumulated slag S to be mixed in the slag cooling water W which is extracted. In this way, it is possible to reduce a load which is applied to the slag separation device 10 in the reverse flow operation mode and the stirring operation mode (described later).

Further, one end of the water supply line 23 is connected to the downstream side of the slag separation device 10, as indicated by reference numeral 23a, whereby it is possible to perform the reverse flow operation and a stirring operation (described later) even in a case where the slag separation device 10 has stopped due to a failure or the like.

The other end of the water supply line 23 is connected to the section between the circulation cutoff valve 26 in the slag cooling water circulation line 7B and the return flow part 5b of the slag bath 5, whereby it is possible to connect the other end of the water supply line 23 to the slag bath 5 by using the existing pipe (7B) without newly drilling the gasifier 2 and the slag bath 5. For this reason, the disposition of the water supply line 23 becomes easy.

In the stirring operation mode, the control unit 35A operates the selective supply unit DA, the water supply valve 28, and the stirring line valve 30 such that the slag cooling water W discharged from the circulation pump 20 is injected to the bottom portion 5a of the slag bath 5 via the stirring line 7S. That is, as shown in FIG. 2, the water feed cutoff valve 25, the circulation cutoff valve 26, and the reverse flow cutoff valve 27 are closed and the water supply valve 28 and the stirring line valve 30 are opened. The water supply valve 28A (28B) of the water supply line 23A (23B) is also opened as necessary.

In this way, the slag cooling water W (the external water) discharged from the circulation pump 20 is injected from the bottom portion 5a of the slag bath 5 via the stirring line 7S. For this reason, the slag S accumulated on the bottom portion 5a of the slag bath 5 is stirred and diluted to be fluidized and is easily sucked out through the slag suction port 7p of the slag cooling water feed line 7A, whereby it is possible to suppress the blockage of the slag suction port 7p or the slag cooling water feed line 7A.

In the slag discharge system 1A, the reverse flow line 7R is one pipe which connects the slag cooling water feed line 7A from the slag suction port 7p to the slag separation device 10 and the slag cooling water circulation line 7B from the circulation pump 20 to the return flow part 5b to the slag bath 5 to each other in a bypass manner, in the loop-shaped slag line 7 which extends from the slag bath 5 and is connected to the return flow part 5b of the slag bath 5 again, and therefore, the reverse flow line 7R can be easily disposed.

Further, the selective supply unit DA can be relatively easily configured by combining a plurality of cutoff valves 25, 26, and 27, as in this embodiment, or by using a multi-way valve. Therefore, there is no concern that the configuration of the slag discharge system 1A may be complicated.

Furthermore, the stirring line 7S is also a simple pipe connecting the slag cooling water circulation line 7B and the bottom portion 5a of the slag bath 5, and only the stirring line valve 30 is provided in the middle thereof. Therefore, the stirring line 7S can be installed without complicating the configuration of the slag discharge system 1A.

The circulation cutoff valve 26 is provided in the selective supply unit DA, whereby the slag cooling water W or the external water discharged from the circulation pump 20 can be allowed to preferentially flow to the reverse flow line 7R by closing the circulation cutoff valve 26 or reducing the degree of opening thereof at the time of the execution of the reverse flow operation mode. In this way, it is possible to reliably and quickly eliminate the blockage of the slag suction port 7p and the slag cooling water feed line 7A.

Since either the backwash-purging of the slag cooling water feed line 7A using the reverse flow line 7R or the stirring and the dilution of the slag S using the stirring line 7S are completed in a short time, it is not necessary to execute the reverse flow operation mode and the stirring operation mode over a long period of time and there is no case where the operation of the gasifier 2 is interrupted. By sequentially or simultaneously executing the reverse flow operation mode and the stirring operation mode, even if the slag S remains or accumulates in the interior of the slag cooling water feed line 7A or on the bottom portion 5a of the slag bath 5, it is possible to smoothly perform the operation of the gasifier 2 by suppressing the blockage of the slag suction port 7p or the slag cooling water feed line 7A by the slag S and making it easy to suck the slag S out through the slag suction port 7p.

Switching between the normal operation mode, the reverse flow operation mode, and the stirring operation mode may be artificially performed by an operator operating the control unit 35A while monitoring the state of the slag suction port 7p. However, it is also possible to cause the control unit 35A to automatically perform the switching, based on the data of the pressure gauge 16 which measures the pressure on the suction side of the circulation pump 20.

That is, at the time of the start-up of the gasifier 2 or in the normal operation mode, if the slag S accumulates around the slag suction port 7p or in the interior of the slag cooling water feed line 7A, so that there is a tendency to a blockage, the pressure on the suction side of the circulation pump 20 is lowered. When the pressure data exceeds a predetermined threshold value, the control unit 35A controls the selective supply unit DA and the water supply valve 28 such that the normal operation mode is switched to the reverse flow operation mode, and thus the interior of the slag cooling water feed line 7A is backwash-purged, whereby the blockage of the slag suction port 7p and the slag cooling water feed line 7A is suppressed or eliminated.

Alternatively, when the pressure data exceeds a predetermined threshold value, the control unit 35A controls the selective supply unit DA, the water supply valve 28, and the stirring line valve 30 so as to execute the stirring operation mode at the same time as the execution of the reverse flow operation mode or following the reverse flow operation mode, whereby it is possible to suppress or eliminate the blockage of the slag suction port 7p and the slag cooling water feed line 7A by stirring and diluting the slag S accumulated on the bottom portion 5a of the slag bath 5 and making it easy to suck the slag S out through the slag suction port 7p.

In this way, with a simple configuration in which the pressure gauge 16 is provided on the suction side of the circulation pump 20 and the pressure data is input to the control unit 35A to cause the control unit 35A to control the selective supply unit DA, the water supply valve 28, and the stirring line valve 30, it is possible to automatically suppress the blockage of the slag suction port 7p and the slag cooling water feed line 7A.

FIG. 3 is a flowchart showing a flow of operation control of the slag discharge system 1A. Describing this flow, at the time of the start-up of the gasifier 2 and after the starting of the operation, a pressure measurement step of measuring the pressure on the suction side of the circulation pump 20 by the pressure gauge 16 and inputting the measured pressure to the control unit 35A is executed (Step S1). Next, in the control unit 35A, a blockage determination step of determining the blocked state of the slag suction port 7p, based on the input pressure data, is executed (Step S2).

In a case where a determination that the slag suction port 7p has not been blocked is made in the blockage determination step S2, that is, a case where the pressure on the suction side of the circulation pump 20 has not reached the predetermined threshold value, the control remains or returns to the original state, and the pressure measurement step S1 and the blockage determination step S2 are repeated.

Further, in a case where a determination that the slag suction port 7p has been blocked or there is a sign of the blockage is made in the blockage determination step S2, that is, a case where the pressure on the suction side of the circulation pump 20 has reached the predetermined threshold value, any one or both of a reverse flow step (Step S3) and a stirring step (Step S4) are executed. The execution time of the reverse flow step S3 and the stirring step S4 may be short.

In this way, the blockage of the slag suction port 7p and the slag cooling water feed line 7A is suppressed or eliminated, as described above. Thereafter, the control returns to the original state, and during the operation, Steps S1 to S4 are repeated.

In this manner, the pressure measurement step S1 of measuring the pressure on the suction side of the circulation pump 20, and the blockage determination step S2 of determining the blocked state of the slag suction port 7p, based on the pressure data measured in the pressure measurement step S1, are provided, and when a determination that the slag suction port 7p has been blocked is made in the blockage determination step S2 or when a determination that there is a sign of blockage is made in the blockage determination step S2, the reverse flow step S3 and the stirring step S4 are executed. According to this operation method, it is possible to automatically suppress or eliminate the blockage of the slag suction port 7p and the slag cooling water feed line 7A with a simple configuration.

Even in a case where the pressure on the suction side of the circulation pump 20 has not reached the predetermined threshold value, the stirring step S4 is periodically and instantaneously executed so as to stir the slag S in the slag bath 5, whereby it is possible to prevent the slag suction port 7p and the slag cooling water feed line 7A from being blocked by the slag S, before it happens.

Second Embodiment

Figure 4:
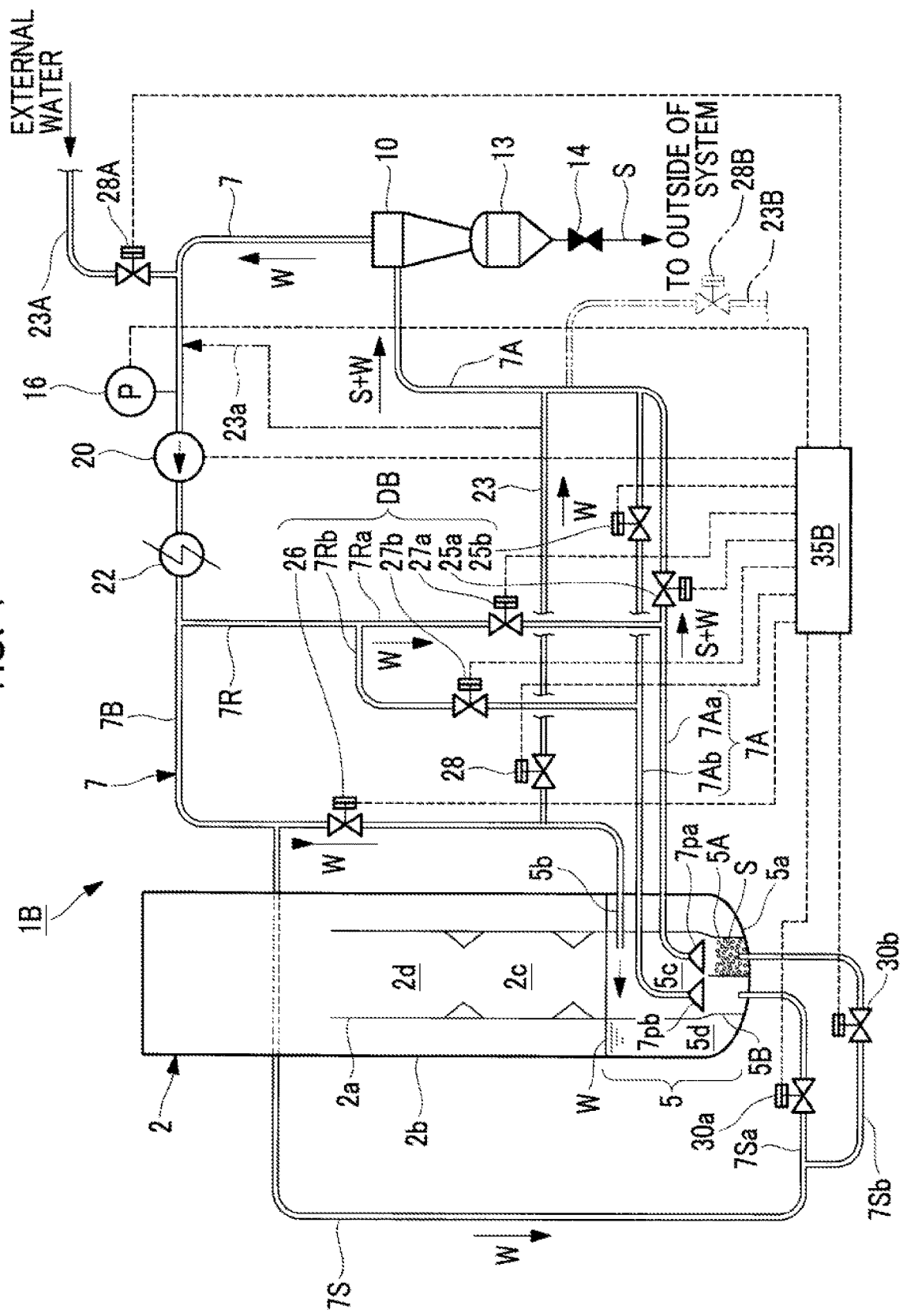
FIG. 4 is a schematic configuration diagram of a gasifier and a slag discharge system showing a second embodiment of the present invention.

FIG. 4 is a schematic configuration diagram of a gasifier and a slag discharge system showing a second embodiment of the present invention. A slag discharge system 1B of this embodiment basically has the same configuration as the slag discharge system 1A of the first embodiment. However, the slag discharge system 1B of this embodiment is different from the slag discharge system 1A of the first embodiment in that a plurality of (for example, two) slag pots 5A and 5B are provided side by side in the inner space 5c of the slag bath 5 and each of an upstream-side section of the slag cooling water feed line 7A, a downstream-side section of the reverse flow line 7R, and a downstream-side section of the stirring line 7S branches into a plurality of portions. Since the parts denoted by the same reference numerals as those in FIG. 1 have the same configuration as in the first embodiment, overlapping description is omitted.

The upstream-side section of the slag cooling water feed line 7A branches into two water feed branch lines 7Aa and 7Ab which are respectively connected to the two slag pots 5A and 5B, and slag suction ports 7pa and 7pb are provided at the respective tips thereof. Water feed cutoff valves 25a and 25b are respectively connected to the two water feed branch lines 7Aa and 7Ab.

The downstream-side section of the reverse flow line 7R branches into two reverse flow branch lines 7Ra and 7Rb which are respectively connected to the two water feed branch lines 7Aa and 7Ab, and reverse flow cutoff valves 27a and 27b are respectively connected to the reverse flow branch lines 7Ra and 7Rb. The second embodiment is the same as the first embodiment in that the circulation cutoff valve 26 is connected to the slag cooling water circulation line 7B.

A selective supply unit DB is configured of each of the cutoff valves 25a, 25b, 26, 27a, and 27b described above, and the reverse flow branch lines 7Ra and 7Rb. The selective supply unit DB makes it possible to selectively supply the slag cooling water W (the external water) discharged from the circulation pump 20 to the return flow part 5b and any one of the slag suction ports 7pa and 7pb, and selectively supplies the slag cooling water W (the external water) which is supplied from the reverse flow line 7R to the plurality of water feed branch lines 7Aa and 7Ab. Each of the cutoff valves 25a, 25b, 26, 27a, and 27b and the water supply valves 28, 28A, and 28B may be a valve which is manually opened and closed. However, in this embodiment, the valves are electromagnetic valves, the opening and closing of which is electrically controlled by a control unit 35B.

On the other hand, the downstream-side section of the stirring line 7S branches into two stirring branch lines 7Sa and 7Sb which are respectively connected to the bottom portions 5a of the two slag pots 5A and 5B, and stirring line valves 30a and 30b are respectively connected to the stirring branch lines 7Sa and 7Sb. The stirring line valves 30a and 30b are also cutoff valves, the opening and closing of which is electrically controlled by the control unit 35B, and are valves which selectively supply the slag cooling water W (the external water) which is supplied from the stirring line 7S to the plurality of stirring branch lines 7Sa and 7Sb.

The slag discharge system 1B configured as described above has three operation modes; the "normal operation mode", the "reverse flow operation mode", and the "stirring operation mode", as shown in the table of FIG. 5, similar to the slag discharge system 1A of the first embodiment.

In the normal operation mode, the control unit 35B operates the selective supply unit DB and the stirring line valves 30a and 30b such that the slag cooling water W discharged from the circulation pump 20 flows to the return flow part 5b of the slag bath 5 (the slag pots 5A and 5B) through only the slag cooling water circulation line 7B without passing through the reverse flow line 7R and the stirring line 7S. That is, as shown in FIG. 5, one of the water feed cutoff valves 25a and 25b is opened, whereas the other is closed, and the circulation cutoff valve 26 is opened, and the reverse flow cutoff valves 27a and 27b and the stirring line valves 30a and 30b are closed. The water supply valve 28 is also closed.

In this way, a water stream from the slag suction port 7pa or 7pb to the slag separation device 10 is formed in the water feed branch line 7Aa or 7Ab in which the water feed cutoff valve 25a or 25b is opened, and thus the slag slurry S+W accumulated on the bottom portion 5a of the slag pot 5A or 5B is sucked out through the slag suction port 7pa or 7pb and sent to the slag separation device 10. The slag cooling water W from which the slag S is separated in the slag separation device 10 is returned to the slag pots 5A and 5B via the slag cooling water circulation line 7B and the return flow part 5b.

Further, in the reverse flow operation mode, the control unit 35B operates the selective supply unit DB, the stirring line valves 30a and 30b, and the water supply valve 28 such that the slag cooling water W discharged from the circulation pump 20 passes through the reverse flow branch line 7Ra or 7Rb of the reverse flow line 7R. That is, as shown in FIG. 5, the water feed cutoff valves 25a and 25b, the circulation cutoff valve 26, and the stirring line valves 30a and 30b are closed, and one of the reverse flow cutoff valves 27a and 27b is opened, whereas the other is closed, and the water supply valve 28 is opened. In this way, the slag cooling water W discharged from the circulation pump 20 reversely flows to the slag pot 5A or 5B through the reverse flow branch line 7Ra or 7Rb of the reverse flow line 7R and through the water feed branch line 7Aa or 7Ab. The slag cooling water W stored in the slag bath 5 is supplied from the water supply line 23 to the suction side of the circulation pump 20.

For this reason, the interior of the upstream-side portion of either the water feed branch line 7Aa or the water feed branch line 7Ab is backwash-purged, and thus even if the slag S accumulates around the slag suction port 7pa or 7pb or the slag S remains in the interior of the water feed branch line 7Aa or 7Ab, the slag S flows to be returned to the slag pot 5A or 5B side by the reverse flow of the slag cooling water W or the external water, whereby the blockage of the water feed branch line 7Aa or 7Ab is suppressed or eliminated.

According to the configuration described above, in the normal operation mode of the slag discharge system 1B, the slag pot 5A on one side is used and the slag pot 5B on the other side is made to be in a standby state (or vice versa). That is, the water feed cutoff valve 25a is opened and the water feed cutoff valve 25b is closed. Then, when a predetermined operation time has elapsed and the water feed branch line 7Aa on one side, which sucks the slag S out from the slag pot 5A on one side, has a tendency to a blockage by the slag S, the selective supply unit DB is switched such that the slag pot 5A on one side is in a standby state and the slag S in the slag pot 5B on the other side is sucked out by the water feed branch line 7Ab on the other side. That is, the water feed cutoff valve 25a is closed and the water feed cutoff valve 25b is opened.

When this switching operation is performed, the selective supply unit DB is operated to make the slag cooling water W or the external water discharged from the circulation pump 20 temporarily flow from the reverse flow line 7R to the water feed branch line 7Ab on the other side, and thus the interior of the water feed branch line 7Ab on the other side is backwash-purged toward the slag pot 5B. That is, the operation mode is temporarily switched to the reverse flow operation mode.

In this way, even if the slag S accumulates or remains in the interior of the water feed branch line 7Ab on the other side, which is in the standby state, the slag S which remains flows to be returned to the slag pot 5B side, so that a possibility of a blockage of the water feed branch line 7Ab is eliminated, and thereafter, the slag S in the slag pot 5B on the other side is sucked out by the water feed branch line 7Ab and the normal operation can be continued. Even when the operation is switched from the slag pot 5B on the other side to the slag pots 5A on one side, similarly, backwash-purging of the water feed branch line 7Aa is performed.

In this manner, by alternately using the plurality of slag pots 5A and 5B and performing backwash-purging of the water feed branch lines 7Aa and 7Ab by temporarily switching to the reverse flow operation mode before the alternation, it is possible to smoothly perform a continuous operation without interrupting the operation of the gasifier 2.

Further, in the stirring operation mode, the control unit 35B operates the selective supply unit DB, the stirring line valves 30a and 30b, and the water supply valve 28 such that the slag cooling water W discharged from the circulation pump 20 is injected to the bottom portion 5a of the slag pot 5A or 5B via either the stirring branch line 7Sa or the stirring branch line 7Sb of the stirring line 7S. That is, as shown in FIG. 5, the water feed cutoff valves 25a and 25b, the circulation cutoff valve 26, and the reverse flow cutoff valves 27a and 27b are closed, and one of the stirring line valves 30a and 30b is opened, whereas the other is closed, and the water supply valve 28 is opened. In this way, the slag cooling water W discharged from the circulation pump 20 and the external water supplied from the water supply lines 23A and 23B are injected to the bottom portion 5a of the slag pot 5A or 5B via the stirring branch line 7Sa or 7Sb.

According to the configuration described above, in a case where the plurality of slag pots 5A and 5B are alternately used as described above, it is possible to execute the reverse flow operation mode in which the backwash-purging of the water feed branch lines 7Aa and 7Ab is performed by using the reverse flow line 7R and to execute the stirring operation mode in which the stirring line valves 30a and 30b are opened, whereby the slag cooling water W discharged from the circulation pump 20 is injected from the plurality of stirring branch lines 7Sa and 7Sb to the bottom portions 5a of the slag pots 5A and 5B. In this way, the slag S accumulated on the bottom portions 5a of the slag pots 5A and 5B is stirred and diluted to be fluidized and is easily sucked out through the slag suction ports 7pa and 7pb of the water feed branch lines 7Aa and 7Ab, and thus the blockage of the water feed branch lines 7Aa and 7Ab can be suppressed.

Such switching between the normal operation mode, the reverse flow operation mode, and the stirring operation mode may be artificially performed. However, similar to the slag discharge system 1A of the first embodiment, the control unit 35B may automatically perform the switching, based on the data of the pressure gauge 16.

Third Embodiment

Figure 6:
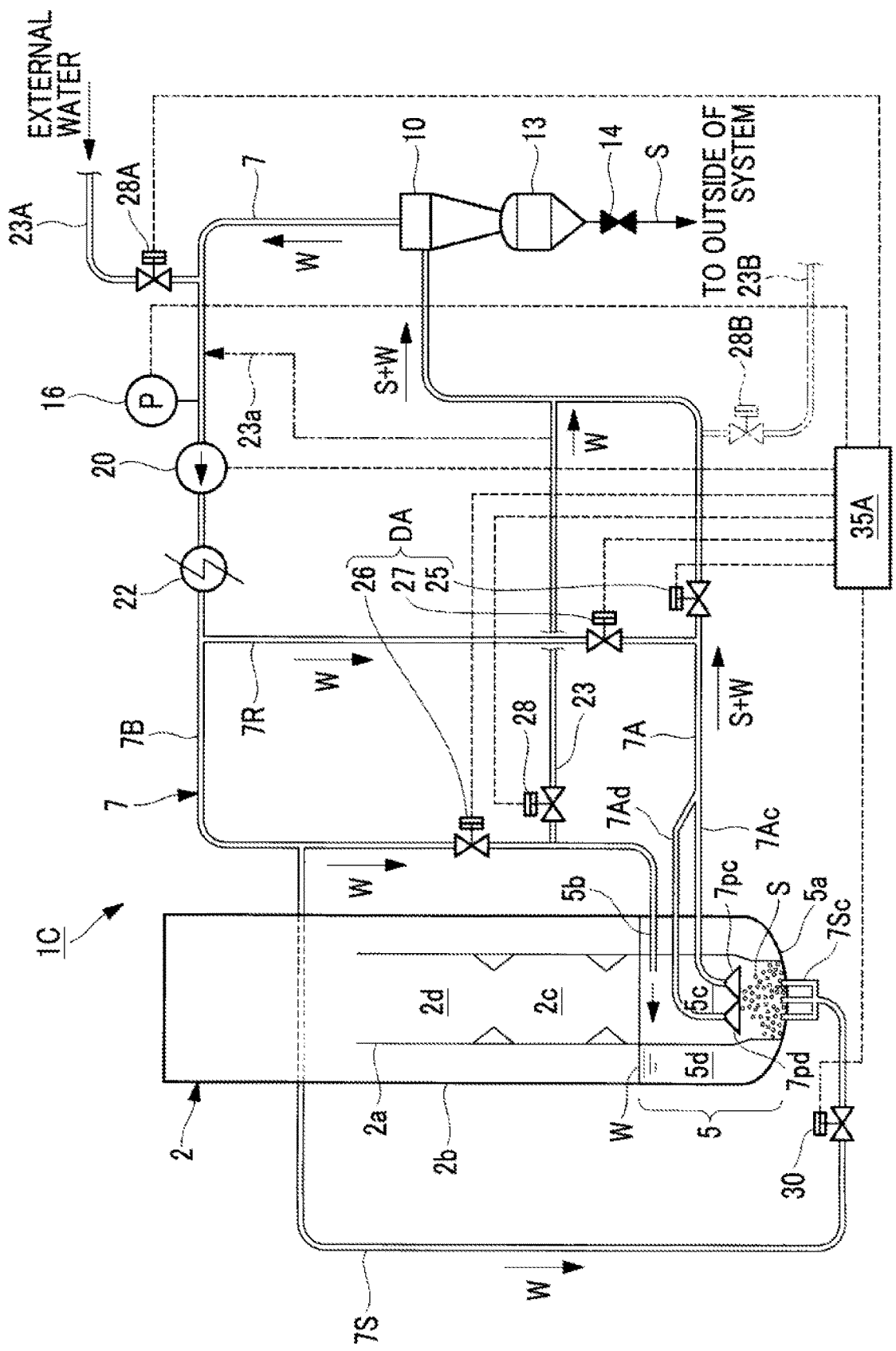
FIG. 6 is a schematic configuration diagram of a gasifier and a slag discharge system showing a third embodiment of the present invention.

FIG. 6 is a schematic configuration diagram of a gasifier and a slag discharge system showing a third embodiment of the present invention. A slag discharge system 1C of this embodiment is different from the slag discharge system 1A of the first embodiment in that a plurality of slag suction ports 7pc and 7pd are provided with respect to a single slag bath 5 and a connection portion 7Sc of the stirring line 7S to the bottom portion 5a of the inner space 5c of the slag bath 5 branches into a plurality of portions, which are connected to the bottom portion 5a, and with respect to other respects, the slag discharge system 1C of this embodiment is the same as the slag discharge system 1A of the first embodiment.

Therefore, the same constituent parts are denoted by the same reference numerals, and description thereof is omitted.

The slag cooling water feed line 7A configuring the upstream portion of the slag line 7 branches into, for example, two water feed branch lines 7Ac and 7Ad toward the slag bath 5, and the slag suction ports 7pc and 7pd are provided at the tips of the water feed branch lines 7Ac and 7Ad, respectively. The two water feed branch lines 7Ac and 7Ad are merged into one before a connection portion with the reverse flow line 7R.

For this reason, during the execution of the normal operation mode, the slag slurry S+W accumulated on the bottom portion 5a of the slag bath 5 is evenly sucked out through the two slag suction ports 7pc and 7pd and is sent to the slag separation device 10 via the two water feed branch lines 7Ac and 7Ad and the slag cooling water feed line 7A.

Further, during the execution of the reverse flow operation mode, the slag cooling water W and the external water which are supplied from the reverse flow line 7R are evenly distributed to the two water feed branch lines 7Ac and 7Ad.

In this manner, the plurality of slag suction ports 7pc and 7pd are provided with respect to the single slag bath 5, whereby the ratio of the suction area of the slag suction ports 7pc and 7pd to the planar area of the slag bath 5 increases. For this reason, it is possible to lower a probability that the slag suction ports 7pc and 7pd are blocked by the slag S or to prolong a time until the slag suction ports 7pc and 7pd are blocked, and it is possible to enhance capability to carry out the slag S by reducing the frequency of executing the reverse flow operation mode or the stirring operation mode.

On the other hand, the connection portion 7Sc of the stirring line 7S to the bottom portion 5a of the slag bath 5 branches into, for example, three portions. In this way, during the execution of the stirring operation mode, the slag S accumulated on the bottom portion 5a of the slag bath 5 is more widely stirred and fluidized, and thus it is possible to suppress or eliminate the blockage of the slag suction ports 7pc and 7pd and the slag cooling water feed line 7A (the water feed branch lines 7Ac and 7Ad).

Fourth Embodiment

Figure 7:
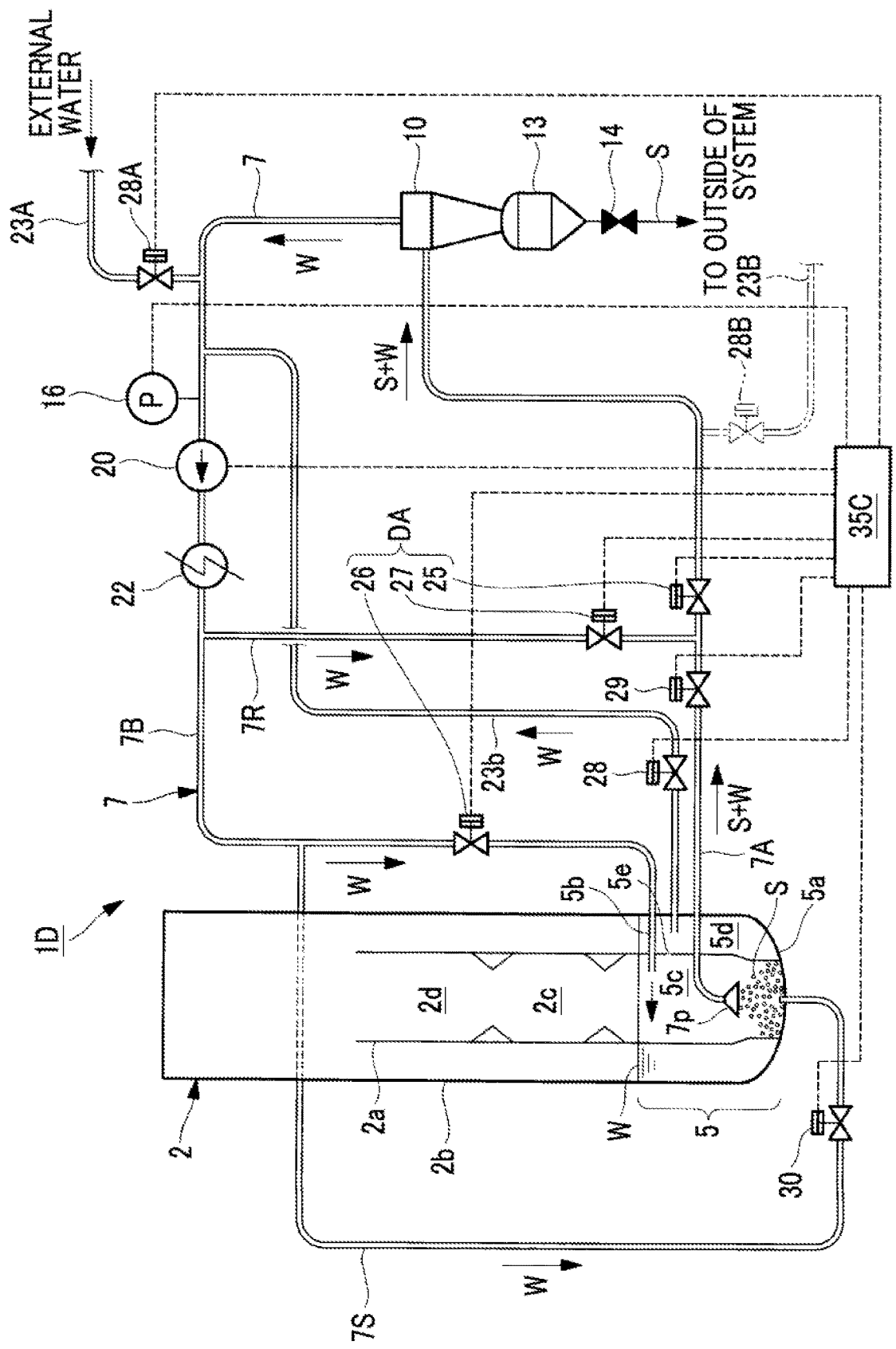
FIG. 7 is a schematic configuration diagram of a gasifier and a slag discharge system showing a fourth embodiment of the present invention.

FIG. 7 is a schematic configuration diagram of a gasifier and a slag discharge system showing a fourth embodiment of the present invention. A slag discharge system 1D of this embodiment basically has the same configuration as the slag discharge system 1A of the first embodiment. However, the slag discharge system 1D of this embodiment is different from the slag discharge system 1A of the first embodiment in that a water supply line 23b is connected to the slag bath 5 and the slag cooling water circulation line 7B and an inflow cutoff valve 29 is provided further toward the gasifier 2 side than a connection position with the reverse flow line 7R in the slag cooling water feed line 7A. The same configurations as those in the first embodiment are denoted by the same reference numerals, and description thereof is omitted.

As shown in FIG. 7, in the water supply line 23b in this embodiment, an upstream end thereof in the flow of the slag cooling water W in the reverse flow operation mode penetrates the outer vessel 2b and communicates with the outer space 5d of the slag bath 5. Further, a downstream end of the water supply line 23b in the flow of the slag cooling water W in the reverse flow operation mode is connected to the section between the slag separation device 10 and the circulation pump 20 in the slag cooling water circulation line 7B.

Further, in the slag cooling water feed line 7A in this embodiment, the inflow cutoff valve 29 is provided further toward the gasifier 2 side (that is, further toward the upstream side in the flow of the slag cooling water W in the normal operation mode) than the connection position with the reverse flow line 7R. A control unit (switching means) 35C in this embodiment controls each valve, as described in the first embodiment, and also controls the degree of opening of the inflow cutoff valve 29. In the normal operation mode, the reverse flow operation mode, and the stirring operation mode, the inflow cutoff valve 29 is controlled so as to be in an open state.

The slag discharge system 1D has a "separation device cleaning mode", in addition to the "normal operation mode", the "reverse flow operation mode", and the "stirring operation mode". The normal operation mode, the reverse flow operation mode, and the stirring operation mode are substantially the same as those in the first embodiment, and therefore, with respect to the same contents, description thereof is omitted. The reverse flow operation mode and the stirring operation mode in this embodiment are different from those in the first embodiment in that the slag cooling water W is supplied to the circulation pump 20 through the water supply line 23b. That is, in this embodiment, the slag cooling water W is extracted from the outer space 5d in which the slag S hardly exists, of the slag bath 5, and the extracted slag cooling water W flows into the slag cooling water circulation line 7B on the downstream side of the slag separation device 10 (in the section between the slag separation device 10 and the circulation pump 20).

With such a configuration, in the reverse flow operation mode and the stirring operation mode, it is possible to supply the slag cooling water W in which the slag S is hardly included to the circulation pump 20 without passing through the slag separation device 10. Since the slag cooling water W in which the slag S is hardly included can be supplied to the circulation pump 20 without passing through the slag separation device 10, it is possible to perform the reverse flow operation mode and the stirring operation mode even in a case where the slag separation device 10 has stopped due to a failure or the like, and to prevent wear of or damage to the circulation pump 20 and piping due to the slag S.

In the separation device cleaning mode (a separation device cleaning step), the control unit 35C operates the selective supply unit DA, the water supply valve 28, the stirring line valve 30, and the inflow cutoff valve 29 such that the slag cooling water (a fluid) W discharged from the circulation pump 20 is supplied to the slag separation device 10 via the reverse flow line 7R. That is, the circulation cutoff valve 26, the stirring line valve 30, and the inflow cutoff valve 29 are closed, and the reverse flow cutoff valve 27, the water supply valve 28, and the water feed cutoff valve 25 are opened. The water supply valve 28A (28B) of the water supply line 23A (23B) is also opened as necessary.

In this way, the slag cooling water W extracted from the outer space 5d of the slag bath 5 is supplied to the circulation pump 20 without passing through the slag separation device 10. The slag cooling water W (and/or the external water) discharged from the circulation pump 20 is supplied to the slag separation device 10 through the reverse flow line 7R and the slag cooling water feed line 7A. In this manner, in the separation device cleaning mode, it is possible to supply the slag cooling water W in which the slag S is hardly included to the circulation pump 20 without passing through the slag separation device 10. Therefore, in a case where a blockage occurs in the interior of the slag separation device 10 due to the slag S, if the separation device cleaning mode is performed, the slag cooling water W flowing through the reverse flow line 7R is supplied to the slag separation device 10, and thus the slag S which is a cause of the blockage is swept away to the lock hopper 13 by the slag cooling water W (and/or the external water) which is supplied to the slag separation device 10, so that the blockage of the interior of the slag separation device 10 can be eliminated. The separation device cleaning mode is preferably performed when a blockage by the slag S has occurred in the interior of the slag separation device 10 or when there is a sign of the blockage. However, the separation device cleaning mode may be performed at predetermined time intervals. Further, whether a blockage by the slag S has occurred in the interior of the slag separation device 10 or whether there is a sign of the blockage may be determined based on the pressure value measured by the pressure gauge 16.

In this embodiment, whether the slag cooling water W flowing from the reverse flow line 7R into the slag cooling water feed line 7A is supplied to the slag suction port 7p (the reverse flow operation mode) or supplied to the slag separation device 10 (the separation device cleaning mode) is switched by the water feed cutoff valve 25 and the inflow cutoff valve 29. However, a three-way valve may be provided in the connection portion between the reverse flow line 7R and the slag cooling water feed line 7A so as to switch a supply destination of the slag cooling water W.

As described above, according to the slag discharge systems 1A, 1B, 1C, and 1D of the first to fourth embodiments and the gasifier 2 provided with each of the slag discharge systems 1A, 1B, 1C, and 1D, it is possible to suppress or eliminate the blockage of the slag suction ports 7p and 7pa to 7pd for sucking the slag S out from the bottom portion of the gasifier 2 by the slag S and smoothly perform the operation of the gasifier 2, with a simple configuration.

Each of the control units 35A to 35C which are used in the first to fourth embodiments is configured of, for example, a CPU (Central Processing Unit), a RAM (Random Access Memory), a ROM (Read Only Memory), a computer-readable storage medium, and the like. Then, a series of processing for realizing various functions is stored in a storage medium or the like in the form of a program, as an example, and the CPU reads the program to the RAM or the like and executes information processing and calculation processing, whereby various functions are realized. As the program, a form installed in the ROM or other storage media in advance, a form which is provided in a state of being stored in a computer-readable storage medium, a form which is delivered through wired or wireless communication means, or the like may be applied. The computer-readable storage medium is a magnetic disk, a magneto-optical disk, a CD-ROM, a DVD-ROM, a semiconductor memory, or the like.

The present invention is not limited only to the configurations of the embodiments described above, and it is possible to appropriately add modifications or improvements thereto, and embodiments with such modifications and improvements added thereto are also included in the scope of rights of the present invention.

For example, it is conceivable to appropriately change the connection order, the installation position, or the like of each constituent member in each of the embodiments described above. Further, in the embodiments described above, each of the selective supply units DA and DB is composed of a plurality of cutoff valves 25, 25a, 25b, 26, 27, 27a, and 27b.

However, it may have a configuration in which a plurality of cutoff valves are combined by a multi-way valve such as a three-way valve or a four-way valve. Similarly, a change such as replacing the two stirring line valves 30a and 30b in the second embodiment by one three-way valve may be made.

REFERENCE SIGNS LIST 1A, 1B, 1C, 1D: slag discharge system
2: gasifier
5: slag bath
5A, 5B: slag pot
5a: bottom portion of slag bath
5c: inner space
5d: outer space
7A: slag cooling water feed line
7Aa, 7Ab: water feed branch line
7B: slag cooling water circulation line
7R: reverse flow line
7S: stirring line
7Sa, 7Sb: stirring branch line
7p, 7pa to 7pd: slag suction port
10: slag separation device
16: pressure gauge
20: circulation pump
23, 23a, 23A, 23B: water supply line
25, 25a, 25b: water feed cutoff valve
26: circulation cutoff valve
27, 27a, 27b: reverse flow cutoff valve
28, 28A, 28B: water supply valve
30, 30a, 30b: stirring line valve
35A, 35B, 35C: control unit
DA, DB: selective supply unit
S: slag
S1: pressure measurement step
S2: blockage determination step
S3: reverse flow step
S4: stirring step
W: slag cooling water

The invention claimed is:

1. A slag discharge system comprising:
a slag bath which is provided at a bottom portion of a gasifier for gasifying carbonaceous feedstock to receive slag generated from the carbonaceous feedstock and store slag cooling water for rapidly cooling the slag;
a slag suction port which sucks out the slag accumulated on a bottom portion of the slag bath together with the slag cooling water;
a slag cooling water feed line for transporting the slag and the slag cooling water sucked out through the slag suction port to the outside of the slag bath;
a slag separation device which is connected to the slag cooling water feed line and separates the slag included in the slag cooling water;
a slag cooling water circulation line for circulating the slag cooling water from the slag separation device to the slag bath;
a circulation pump which is connected to the slag cooling water circulation line and forms a water stream for sucking the slag and the slag cooling water out through the slag suction port;
a reverse flow line having one end connected to the slag cooling water feed line, and the other end connected to a downstream side of the circulation pump in the slag cooling water circulation line;
a selective supply unit which makes it possible to selectively supply the slag cooling water discharged from the circulation pump to the slag cooling water circulation line and the reverse flow line;
a water supply line having one end connected to a section adjacent to the slag separation device in the slag cooling water feed line or the slag cooling water circulation line; and
a water supply valve provided in the water supply line.

2. The slag discharge system according to claim 1, wherein the water supply line is supplied with the slag cooling water stored in the slag bath from the other end thereof.

3. The slag discharge system according to claim 2, wherein the water supply line is connected, at the one end thereof, to a downstream side of the slag separation device.

4. The slag discharge system according to claim 2, wherein the water supply line is connected, at the one end thereof, to an upstream side of the slag separation device.

5. The slag discharge system according to claim 2, wherein the water supply line is connected such that the other end thereof merges with a vicinity of a connection portion to the slag bath in the slag cooling water circulation line.

6. The slag discharge system according to claim 3, wherein the gasifier has a combustion part which burns the carbonaceous feedstock to gasify the carbonaceous feedstock,
the slag bath has an inner vessel having an inner space communicating with the combustion part in an interior thereof, and an outer vessel covering the inner vessel, and
the other end of the water supply line is located in an outer space between the inner vessel and the outer vessel.

7. The slag discharge system according to claim 1, wherein the selective supply unit is configured to include
a water feed cutoff valve provided further toward a downstream side than a connection portion of the reverse flow line in the slag cooling water feed line, and
a reverse flow cutoff valve provided in the reverse flow line.

8. The slag discharge system according to claim 7, wherein the selective supply unit further includes a circulation cutoff valve provided further toward a downstream side than the connection portion of the reverse flow line in the slag cooling water circulation line.

9. The slag discharge system according to claim 7, wherein switching means for switching between sending a fluid flowing in from the reverse flow line to the slag suction port side and sending the fluid to the slag separation device side is provided in the slag cooling water feed line.

10. The slag discharge system according to claim 1, further comprising:
a control unit which controls the selective supply unit and the water supply valve.

11. The slag discharge system according to claim 10, further comprising:
a pressure gauge which measures pressure on the suction side of the circulation pump,
wherein the control unit controls the selective supply unit such that the slag cooling water discharged from the circulation pump flows to the slag bath via the reverse flow line, when pressure data measured by the pressure gauge exceeds a predetermined threshold value.

12. The slag discharge system according to claim 1,
wherein the slag bath has a plurality of slag pots provided side by side in an interior thereof,
a plurality of the slag suction ports are provided corresponding to the plurality of slag pots,
an upstream-side section of the slag cooling water feed line branches into a plurality of water feed branch lines which are respectively connected to the plurality of slag suction ports, and
the selective supply unit is able to selectively supply the slag cooling water which is supplied from the reverse flow line to the plurality of water feed branch lines.

13. The slag discharge system according to claim 1,
wherein a plurality of the slag suction ports are provided with respect to a single slag bath.

14. The slag discharge system according to claim 1, further comprising:
a stirring line which branches off from the slag cooling water circulation line and is connected to the bottom portion of the slag bath; and
a stirring line valve connected to the stirring line.

15. The slag discharge system according to claim 14,
wherein the stirring line is provided with a plurality of connection portions to the bottom portion of the slag bath.

16. The slag discharge system according to claim 14,
wherein the slag bath has a plurality of slag pots provided side by side in an interior thereof,
a downstream-side section of the stirring line branches into a plurality of stirring branch lines which are respectively connected to the plurality of slag pots, and
the stirring line valve is able to selectively supply the slag cooling water which is supplied from the stirring line to the plurality of stirring branch lines.

17. The slag discharge system according to claim 14, further comprising:
a pressure gauge which measures pressure on the suction side of the circulation pump; and
a control unit which controls the stirring line valve together with the selective supply unit such that the slag cooling water discharged from the circulation pump is supplied to the slag bath via the stirring line, when pressure data measured by the pressure gauge exceeds a predetermined threshold value.

18. A gasifier comprising:
the slag discharge system according to claim 1.

19. A method for operating a slag discharge system which sucks out slag received in a slag bath of a bottom portion of a gasifier for gasifying carbonaceous feedstock together with slag cooling water through a slag suction port by a circulation pump and sends the slag and the slag cooling water to a slag separation device through a slag cooling water feed line, the method comprising:
a reverse flow step of sending the slag cooling water discharged from the circulation pump to the slag cooling water feed line to make the slag cooling water reversely flow from the slag suction port into the slag bath, when the slag suction port has been blocked by the slag or when there is a sign of a blockage.

20. The method for operating a slag discharge system according to claim 19, further comprising:
a stirring step of injecting the slag cooling water discharged from the circulation pump from a bottom portion of the slag bath into the slag bath, when the slag suction port has been blocked by the slag or when there is a sign of a blockage.

21. The method for operating a slag discharge system according to claim 19, further comprising:
a pressure measurement step of measuring pressure on a suction side of the circulation pump; and
a blockage determination step of determining a blocked state of the slag suction port, based on pressure data measured in the pressure measurement step,
wherein in the blockage determination step, when the pressure data measured in the pressure measurement step exceeds a predetermined threshold value, the reverse flow step or the stirring step is executed.

22. The method for operating a slag discharge system according to claim 19, further comprising:
a separation device cleaning step of sending a fluid discharged from the circulation pump to the slag cooling water feed line so as to be supplied from the slag cooling water feed line to the slag separation device, when a blockage by the slag has occurred in an interior of the slag separation device or when there is a sign of the blockage.

* * * * *